(12) United States Patent
Heubel et al.

(10) Patent No.: US 9,629,062 B2
(45) Date of Patent: *Apr. 18, 2017

(54) LAN BASED WIRELESS COMMUNICATIONS SYSTEM

(71) Applicant: AT&T Mobility II LLC, Atlanta, GA (US)

(72) Inventors: Michael Heubel, Marietta, GA (US); Andrew Clegg, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/488,358

(22) Filed: Sep. 17, 2014

(65) Prior Publication Data

US 2015/0003437 A1    Jan. 1, 2015

Related U.S. Application Data

(63) Continuation of application No. 13/691,081, filed on Nov. 30, 2012, now Pat. No. 8,861,497, which is a
(Continued)

(51) Int. Cl.
*H04W 4/00*     (2009.01)
*H04W 40/20*    (2009.01)
(Continued)

(52) U.S. Cl.
CPC ....... *H04W 40/20* (2013.01); *H04M 3/42314* (2013.01); *H04W 40/02* (2013.01); *H04W 84/16* (2013.01); *H04M 2207/18* (2013.01)

(58) Field of Classification Search
CPC ..... H04W 40/20; H04W 40/02; H04W 84/16; H04M 3/42314; H04M 2207/18; H04M 2207/20; H04M 2207/206; H04M 2207/45
See application file for complete search history.

(56) References Cited

U.S. PATENT DOCUMENTS 5,428,667 A * 6/1995 Easterling ............... H04L 63/00
                                                                455/405
5,513,184 A    4/1996 Vannucci
(Continued)

FOREIGN PATENT DOCUMENTS

EP          1254574        8/2001
WO     WO 0160093 A1      8/2001

OTHER PUBLICATIONS

U.S. Office Action dated Oct. 31, 2006 in U.S. Appl. No. 10/226,027.
(Continued)

*Primary Examiner* — Kevin Mew
(74) *Attorney, Agent, or Firm* — Hartman & Citrin LLC

(57) ABSTRACT

A method of routing calls from a mobile unit to a destination location can include registering the mobile unit with a wireless adjunct, wherein the wireless adjunct is in communication with a switching unit and a packet based network and is operable to receive data from the switching unit and place the data, in packetized form, on the packet based network. The method can further include responding to a call setup request from the mobile unit and querying a subscriber database to determine if the mobile unit is a resident or a guest. If the mobile unit is a resident, communications data can be routed from the mobile unit through the switching unit to a first destination location. If the mobile unit is a guest, communications data can be routed from the mobile unit through an RF source to a second destination location.

17 Claims, 7 Drawing Sheets

Related U.S. Application Data continuation of application No. 12/753,882, filed on Apr. 4, 2010, now Pat. No. 8,331,339, which is a continuation of application No. 12/123,283, filed on May 19, 2008, now Pat. No. 7,720,039, which is a continuation of application No. 10/225,996, filed on Aug. 22, 2002, now Pat. No. 7,385,956.

(51) Int. Cl.
  *H04M 3/42*  (2006.01)
  *H04W 40/02*  (2009.01)
  *H04W 84/16*  (2009.01)

(56) References Cited

U.S. PATENT DOCUMENTS

| | | | |
|---|---|---|---|
| 5,711,006 A | 1/1998 | Brochu et al. | |
| 5,734,699 A | 3/1998 | Lu et al. | |
| 5,818,824 A | 10/1998 | Lu et al. | |
| 5,841,854 A | 11/1998 | Schumacher et al. | |
| 5,873,033 A * | 2/1999 | Hjern | H04M 3/42246 |
| | | | 455/417 |
| 5,922,559 A | 7/1999 | Colwell et al. | |
| 5,960,356 A | 9/1999 | Alperovich et al. | |
| 5,991,639 A | 11/1999 | Rautiola et al. | |
| 6,009,159 A | 12/1999 | Baiyor et al. | |
| 6,014,377 A * | 1/2000 | Gillespie | H04Q 3/0029 |
| | | | 370/310 |
| 6,018,521 A | 1/2000 | Timbs et al. | |
| 6,052,371 A | 4/2000 | Lemieux | |
| 6,070,076 A | 5/2000 | Valentine | |
| 6,111,943 A | 8/2000 | Strom et al. | |
| 6,118,778 A | 9/2000 | Amin | |
| 6,161,016 A * | 12/2000 | Yarwood | H04W 4/06 |
| | | | 455/445 |
| 6,169,750 B1 | 1/2001 | Tomono et al. | |
| 6,185,204 B1 | 2/2001 | Voit | |
| 6,205,139 B1 | 3/2001 | Volt | |
| 6,308,267 B1 | 10/2001 | Gremmelmaier | |
| 6,363,065 B1 | 3/2002 | Thornton et al. | |
| 6,366,771 B1 | 4/2002 | Angle et al. | |
| 6,445,915 B1 | 9/2002 | Baiyor et al. | |
| 6,493,436 B1 | 12/2002 | Fowler et al. | |
| 6,498,791 B2 | 12/2002 | Pickett et al. | |
| 6,584,317 B2 * | 6/2003 | Mukerjee | H04M 3/465 |
| | | | 455/414.1 |
| 6,674,787 B1 | 1/2004 | Dick et al. | |
| 6,675,008 B1 * | 1/2004 | Paik | H04M 1/576 |
| | | | 348/14.02 |
| 6,711,401 B1 * | 3/2004 | Chow | H04M 3/42314 |
| | | | 455/414.1 |
| 6,738,639 B1 * | 5/2004 | Gosselin | H04L 12/185 |
| | | | 455/518 |
| 6,751,205 B2 | 6/2004 | Menon et al. | |
| 6,768,722 B1 | 7/2004 | Katseff et al. | |
| 6,816,583 B2 | 11/2004 | Roeder | |
| 6,826,173 B1 | 11/2004 | Kung et al. | |
| 6,829,249 B1 | 12/2004 | Ray et al. | |
| 6,831,903 B2 | 12/2004 | Kang | |
| 6,922,559 B2 | 7/2005 | Mohammed | |
| 6,925,074 B1 | 8/2005 | Vikberg et al. | |
| 6,961,559 B1 * | 11/2005 | Chow | H04M 3/42314 |
| | | | 455/414.1 |
| 7,002,995 B2 | 2/2006 | Chow et al. | |
| 7,020,440 B2 | 3/2006 | Watanabe et al. | |
| 7,042,855 B1 | 5/2006 | Gilchrist et al. | |
| 7,120,135 B2 | 10/2006 | Kim | |
| 7,227,853 B2 | 6/2007 | Jagadeesan et al. | |
| 7,353,024 B2 | 4/2008 | Lee et al. | |
| 7,379,455 B2 | 5/2008 | Pickett | |
| 7,477,893 B2 | 1/2009 | Belkin et al. | |
| 7,567,538 B2 | 7/2009 | Kallio | |
| 2001/0046215 A1 | 11/2001 | Kim | |
| 2002/0027894 A1 | 3/2002 | Arrakoski et al. | |
| 2002/0034168 A1 | 3/2002 | Swartz et al. | |
| 2002/0080757 A1 | 6/2002 | Narvanen et al. | |
| 2002/0114316 A1 | 8/2002 | Buchanan, Jr. | |
| 2002/0114320 A1 | 8/2002 | Ogren | |
| 2002/0137500 A1 * | 9/2002 | Brooking | H04M 3/53366 |
| | | | 455/419 |
| 2002/0176377 A1 | 11/2002 | Hamilton | |
| 2002/0176378 A1 | 11/2002 | Hamilton et al. | |
| 2002/0191557 A1 | 12/2002 | Chow et al. | |
| 2002/0194331 A1 * | 12/2002 | Lewis | G06Q 20/10 |
| | | | 709/224 |
| 2003/0069030 A1 | 4/2003 | Mukherjee | |
| 2003/0081565 A1 | 5/2003 | McIntosh et al. | |
| 2003/0214937 A1 * | 11/2003 | Lindoff | H04W 68/00 |
| | | | 370/350 |
| 2004/0025047 A1 | 2/2004 | Mayne et al. | |
| 2004/0127210 A1 * | 7/2004 | Shostak | G06F 21/35 |
| | | | 455/422.1 |
| 2004/0176129 A1 | 9/2004 | Menon et al. | |
| 2004/0198349 A1 * | 10/2004 | Chin | H04W 76/022 |
| | | | 455/432.1 |
| 2005/0176410 A1 | 8/2005 | Brooking et al. | |
| 2006/0019664 A1 | 1/2006 | Nelakanti et al. | |
| 2008/0225812 A1 | 9/2008 | Burgess et al. | |
| 2010/0002662 A1 | 1/2010 | Schmidt et al. | |
| 2011/0200034 A1 | 8/2011 | Delveaux et al. | |
| 2014/0256361 A1 * | 9/2014 | Gailey | G06F 17/30867 |
| | | | 455/456.3 |

OTHER PUBLICATIONS

U.S. Notice of Allowance dated Jun. 7, 2007 in U.S. Appl. No. 10/226,027.
U.S. Office Action dated Nov. 20, 2006 in U.S. Appl. No. 10/227,031.
U.S. Office Action dated Mar. 22, 2007 in U.S. Appl. No. 10/227,031.
U.S. Office Action dated Feb. 12, 2014 in U.S. Appl. No. 13/691,081.
U.S. Notice of Allowance dated Jun. 10, 2014 in U.S. Appl. No. 13/691,081.
U.S. Notice of Allowance dated Aug. 7, 2012 in U.S. Appl. No. 12/753,882.
U.S. Office Action dated Aug. 26, 2009 in U.S. Appl. No. 12/123,283.
U.S. Notice of Allowance dated Jan. 27, 2010 in U.S. Appl. No. 12/123,283.
U.S. Office Action dated Oct. 4, 2006 in U.S. Appl. No. 10/225,996.
U.S. Office Action dated May 9, 2007 in U.S. Appl. No. 10/225,996.
U.S. Office Action dated Aug. 30, 2007 in U.S. Appl. No. 10/225,996.
U.S. Advisory Action dated Nov. 19, 2007 in U.S. Appl. No. 10/225,996.
U.S. Notice of Allowance dated Feb. 4, 2008 in U.S. Appl. No. 10/225,996.

* cited by examiner

LAN BASED WIRELESS COMMUNICATIONS SYSTEM

CROSS-REFERENCE TO RELATED APPLICATIONS

This Application is a continuation of U.S. application Ser. No. 13/691,081, filed Nov. 30, 2012 (now U.S. Pat. No. 8,861,497), which is a continuation of U.S. application Ser. No. 12/753,882, filed Apr. 4, 2010 (now U.S. Pat. No. 8,331,339), which is a continuation of U.S. application Ser. No. 12/123,283, filed May 19, 2008 (now U.S. Pat. No. 7,720,039), which is a continuation of U.S. application Ser. No. 10/225,996, filed Aug. 22, 2002 (now U.S. Pat. No. 7,385,956), the entireties of which are hereby incorporated by reference. This application is also related to U.S. patent application Ser. No. 10/226,027 filed Aug. 22, 2002 now U.S. Pat. No. 7,269,164, the entirety of which is hereby incorporated by reference. This application is also related to U.S. patent application Ser. No. 10/227,031, filed Aug. 22, 2002, now abandoned.

TECHNICAL FIELD

This invention relates to the field of wireless telecommunications, and more specifically, a system for and method of providing wireless communication through a network infrastructure utilizing packetized data.

BACKGROUND

As the rate of adoption of cellular or mobile telephone use continues to increase, there is a need to provide greater wireless coverage of service areas. One method of increasing that coverage, while also providing additional benefits, is the installation of in-building solutions for customers. In-building solutions feature a wireless adjunct unit in communication with a Private Branch Exchange ("PBX") within a customer's building. While the PBX services the customer's general desk top telephone needs, the wireless adjunct unit acts as an extension of a service provider's mobile telephone network that services the wireless needs of the service provider's customers within the building.

Incoming telephone calls to the PBX may be routed to the desktop telephone and a user's mobile unit, either simultaneously or in some predefined sequential order. When a user goes off-hook on either the mobile unit or the desktop phone, the call is setup and connected through the off-hook device, and any ongoing attempt to setup a call with the non-responding device is terminated. Thus, a user may receive an inbound PBX based call at either the traditional desktop telephone or at her mobile phone. Similarly, outbound calls from the user's mobile unit may be received by the wireless adjunct unit and routed through the building PBX to a destination number. Unfortunately, only users who have access to the PBX may utilize the in-building solution to place outbound calls or to receive inbound calls. Users who are guests within the building are at the mercy of the quality of coverage provided by external base station sites; often, poor coverage from such sites within the building is a large factor in the decision to install the in-building solution.

The wireless adjunct unit may provide base station functionality by interfacing to one or more antennae or repeater sites hardwired to the wireless adjunct unit placed throughout the building. Installation of such a hardwired system can be expensive and time consuming, as wiring needs to be installed or retrofitted throughout the building in order to provide signaling between the antennae or repeater sites and the PBX. In addition, the interfaces between the PBX and the adjunct unit and between the adjunct unit and the repeater sites are generally proprietary to the manufacturer of the equipment, thus limiting customer choice in purchasing and installing in-building solutions.

Embodiments of the present invention are directed to overcoming one or more of the problems identified above.

SUMMARY

A method of routing calls from a mobile unit to a destination location can include registering the mobile unit with a wireless adjunct, wherein the wireless adjunct is in communication with a switching unit and a packet based network and is operable to receive data from the switching unit and place the data, in packetized form, on the packet based network. The method can further include responding to a call setup request from the mobile unit and querying a subscriber database to determine if the mobile unit is a resident or a guest. If the mobile unit is a resident, communications data can be routed from the mobile unit through the switching unit to a first destination location. If the mobile unit is a guest, communications data can be routed from the mobile unit through an RF source to a second destination location.

In one embodiment, the switching unit is a private branch exchange (PBX). In one embodiment, the subscriber database is a local subscriber database stored at the wireless adjunct. In another embodiment, the subscriber database is a network subscriber database.

A system for routing calls to a destination location can include a switching unit, a packet based network, a wireless adjunct in communication with the switching unit and the packet based network, a mobile unit capable of registering with the wireless adjunct and sending a call setup request to the wireless adjunct, and an RF source, in communication with the wireless adjunct. The wireless adjunct can be operable to receive data from the switching unit and place the data, in packetized form, on the packet based network. The wireless adjunct can be further operable to receive the call setup request and query a subscriber database to determine if the mobile unit is a resident or guest. If the wireless adjunct determines that the mobile unit is a resident, the wireless adjunct can route the communications data from the mobile unit through the switching unit to a first destination location. If the wireless adjunct determines that the mobile unit is a guest, the wireless adjunct can route the communications data from the mobile unit through the RF source to a second destination location.

In one embodiment, the switching unit is a PBX. In one embodiment, the subscriber database is a local subscriber database stored at the wireless adjunct. In another embodiment, the subscriber database is a network subscriber database.

A method of routing communications data from a radio transmit point to a switching unit over a packet based network can include registering a mobile unit with a wireless adjunct via a radio transmit point, wherein the wireless adjunct is in communication with a switching unit and a packet based network. The wireless adjunct can be operable to receive data from the switching unit and place the data, in packetized form, on the packet based network. The method can further include responding to a call setup request from the radio transmit point, wherein the call setup request includes the identity of the mobile unit. The method can also include querying a subscriber database to determine if the mobile unit is a resident or a guest. If it is determined that the mobile unit is a resident, communications data can be routed from the radio transmit point through a switching unit to a first destination location. If it is determined that the mobile unit is a guest, communications data can be routed from the mobile unit through an RF source to a second destination location.

In one embodiment, the switching unit is a PBX. In one embodiment, the subscriber database is a local subscriber database stored at the wireless adjunct. In another embodiment, the subscriber database is a network subscriber database.

DESCRIPTION

Reference will now be made in detail to the exemplary embodiments consistent with the principles of the invention, examples of which are illustrated in the accompanying drawings. Wherever possible, the same reference numbers will be used throughout the drawings to refer to the same or like parts.

Embodiments of the present invention provide a system for implementing a wireless adjunct unit in communication with a PBX for providing an in-building solution that reduces installation and maintenance costs by leveraging existing packet-based networks within the building or installation. In an exemplary embodiment of the present invention, the wireless adjunct unit (known as an RF Controller or RFC), in communication with the PBX, communicates across a Local Arena Network (LAN) to a Radio Transmit Point (RTP) that communicates across an air interface to a mobile unit. Incoming and outgoing communication may be routed between the mobile unit and the PBX through the RTP and RFC. By utilizing the LAN to link the adjunct unit to the Radio Transmit Points, the necessity of custom wiring between the RFC and RTP is eliminated. In addition, utilizing a standard packet based communication protocol between the RFC and RTP facilitates interoperability between device manufacturers.

Embodiments of the RFC may provide an interchangeable and expandable input/output structure such that a variety of communications options are possible. For instance, the PBX interface, or switching unit interface, may provide an interface to a PBX that is operable to communicate via a Voice over Internet Protocol standard (VoIP) or may provide an interface to communicate to a PBX that features a T1 or E1 line connection. In another exemplary embodiment, the LAN interface, or network interface, may provide an interface to, for example, a 10BaseT or 802.11b interface. The RFC may also provide an interface to an external RF source for interfacing the external RF source to the network interface. In another exemplary embodiment, the RFC may provide an interface to an external Mobile Switching Center (MSC).

Embodiments of the RTP may, likewise, feature an interchangeable and expandable input/output structure such that a variety of communications options are possible. For example, the RTP network interface may provide an interface to a variety of packet based networks. The air interface of the RTP is also interchangeable, so that the RTP can communicate to a variety of mobile standards, for example TDMA, GSM, CDMA, UMTS, and CDMA2000.

Figure 1:
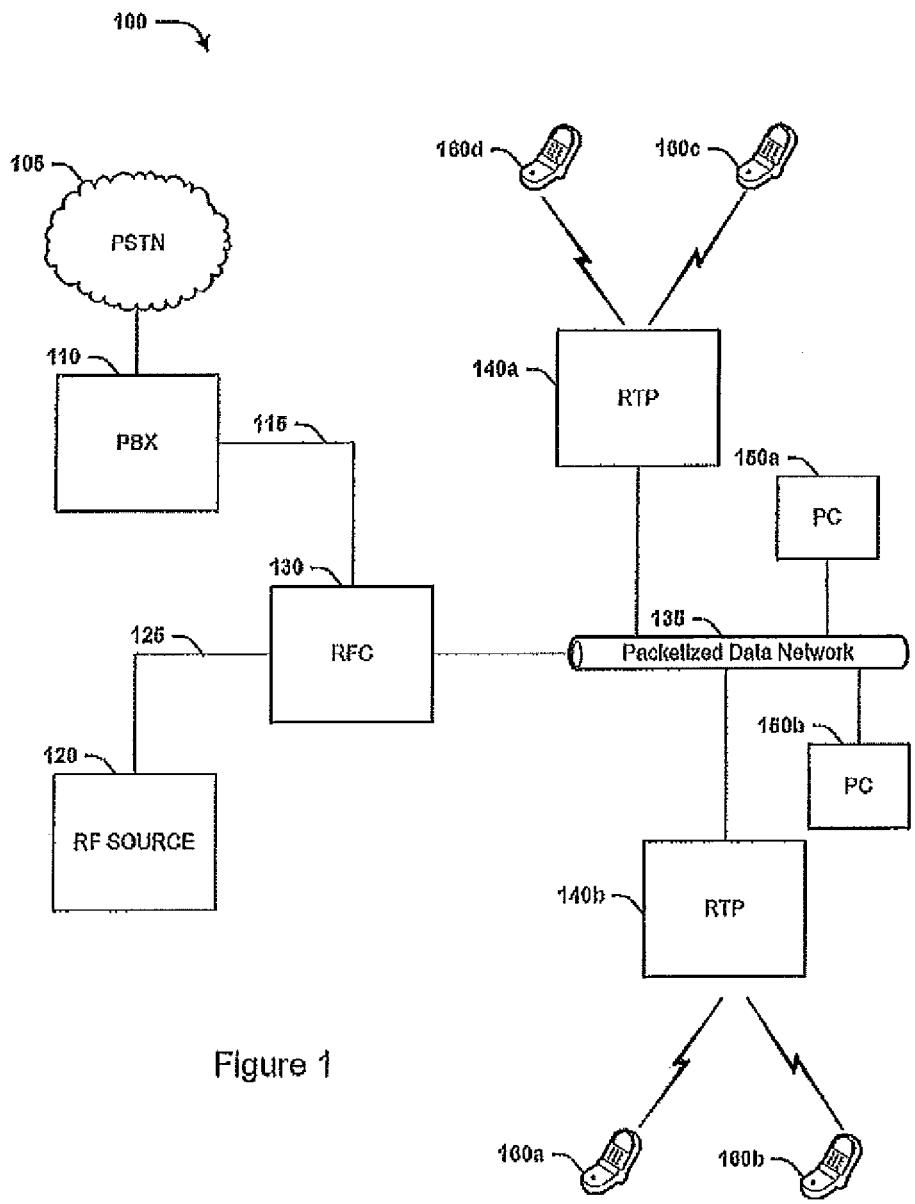
FIG. 1 illustrates a wireless adjunct system for providing wireless communication utilizing a packet based network in an embodiment consistent with the principles of the present invention.

FIG. 1 illustrates a wireless adjunct system 100 for providing wireless communication utilizing a packet based network in an embodiment consistent with the principles of the present invention. A PBX 110 provides an in-building switch for interfacing to a telecommunications system comprising a plurality of land line telephones within a building or plurality of buildings. The PBX 110 interfaces the in-building switch to an external Public Switched Telephone Network (PSTN) 105 via a trunk line. In a standard PBX implementation, an incoming call is routed from the PSTN 105, via the trunk line to the PBX 110 where the PBX 110 routes the call to the appropriate desk phone of the telecommunications systems. Similarly, outbound calls for the desk phone are routed through the PBX 110 to the PSTN 105 for their destination location.

Exemplary embodiments of the present invention provide a wireless adjunct, or RF Controller, 130. The RFC 130 communicates with the PBX 110 over a PBX communications link 115. PBX communications link 115 may provide a variety of link options depending upon the communications capabilities of the PBX 110. In an exemplary embodiment, PBX 110 has a VOIP port so PBX communications link 115 may be a packet based network, such as an Ethernet connection. In another exemplary embodiment, PBX 110 has a Primary Rate Interface (PRI) link with a T1 or E1 line carrying voice data, so the PBX communications link is a T1 or E1 line, as required by the PBX 110. The RFC 130 has the appropriate PBX interface to communicate via PBX communications link 115 to PBX 110. Because of the interchangeable nature of the I/O architecture of the RFC 130 in exemplary embodiments of the present invention, the communications interface used by the PBX 110 may be matched by the RFC 130.

The RFC 130 provides the interface between the PBX 110 and one or more RTPs 140a-b. The RFC 130 may control RF processes, such as call setup and handoff between RTPs 140a-b. The RFC 130 may accept call setup requests from the PBX 110, upon an incoming call to the PBX 110, and direct the call to the appropriate RTP 140a-b. The RFC 130 may also perform system operations and maintenance for the wireless adjunct system comprising the RFC 130 and one or more RTPs 140a-b. The RFC 130 may provide an RF interface to an external RF source for directing calls and communications data between the external RF source and the RTPs 140a-b. The RFC 130 may translate the incoming voice data from baseband data from the RF source into packetized voice data for transmission to the RTPs 140a-b.

Similarly, where the PBX communications link 115 is a T1 or E1/PRI link, the RFC 130 may translate the non-packetized voice data to packetized voice data for transmission to the RTPs 140a-b. In addition to providing non-packetized voice data to packetized voice data conversion, the RFC 130 may provide packetized voice data to non-packetized voice data conversion. Other features and functionality of the RFC 130 will be discussed in more detail at a later point in this description.

The RFC 130 communicates to the RTPs 140a-b via packetized data network 135. Packetized data network 135 may be any type of network capable of communicating packet based data. For example, the packetized data network 135 may be an Ethernet utilizing the TCP/IP protocol. In an exemplary embodiment, the packetized data network 135 may be a hard wired network, such as an Ethernet, or may be a wireless network, for example utilizing the 802.11b or WiFi standard. While it is contemplated that the packetized data network 135 may be an existing network that communicates with one or more personal computers 150a-b, the packetized data network 135 may be installed or expanded for the purposes of implementing embodiments of the present invention. Or, in its most basic form, packetized data network 135, may be a direct serial connection between RFC 130 and RTP 140a-b communicating packet based voice data.

In an exemplary embodiment consistent with principles of the present invention, the voice data communicated between RFC 130 and RTP 140a-b may be based on an industry standard or be a proprietary standard. Industry standard communications include, for example, VOIP standards such as H.323, Simple Gateway Control Protocol (SGCP), Internet Protocol Device Control (IPDC), Session Initiation Protocol (SIP), and Media Gateway Control Protocol (MGCP). Other standards may also be implemented in the present invention. It is contemplated that those standards existing today for transmitting voice as packet data, as well as future standards, may be implemented in embodiments consistent with the present invention. Exemplary embodiments of the present invention may feature an interchangeable architecture to accommodate new and different standards. In fact, as will be explained more fully later, a given RFC 130 or RTP 140a-b may accommodate a variety of protocols and interfaces simultaneously.

The RTPs 140a-b exchange communications data, or voice data, between the RFC 130 and one or more mobile units 160a-d. The RTP 140a-b comprises a network interface for communicating with the packetized data network 135 in communication with a base station component communicating over an air interface to the mobile units 160a-d. Similar to the RFC 130, the RTP 140a-b may have an interchangeable network interface to suit the type of packetized data network employed. The base station component of the RTP 140a-b may also be interchangeable and employ any type of air interface, or a plurality of different air interfaces, to match the mobile communication standard(s) of the mobile units 160a-d. For example, exemplary embodiments of the present invention may utilize a first base station component for communicating TDMA protocol to a first mobile unit and a second base station component for communicating GSM protocol to a second mobile unit.

Figure 2:
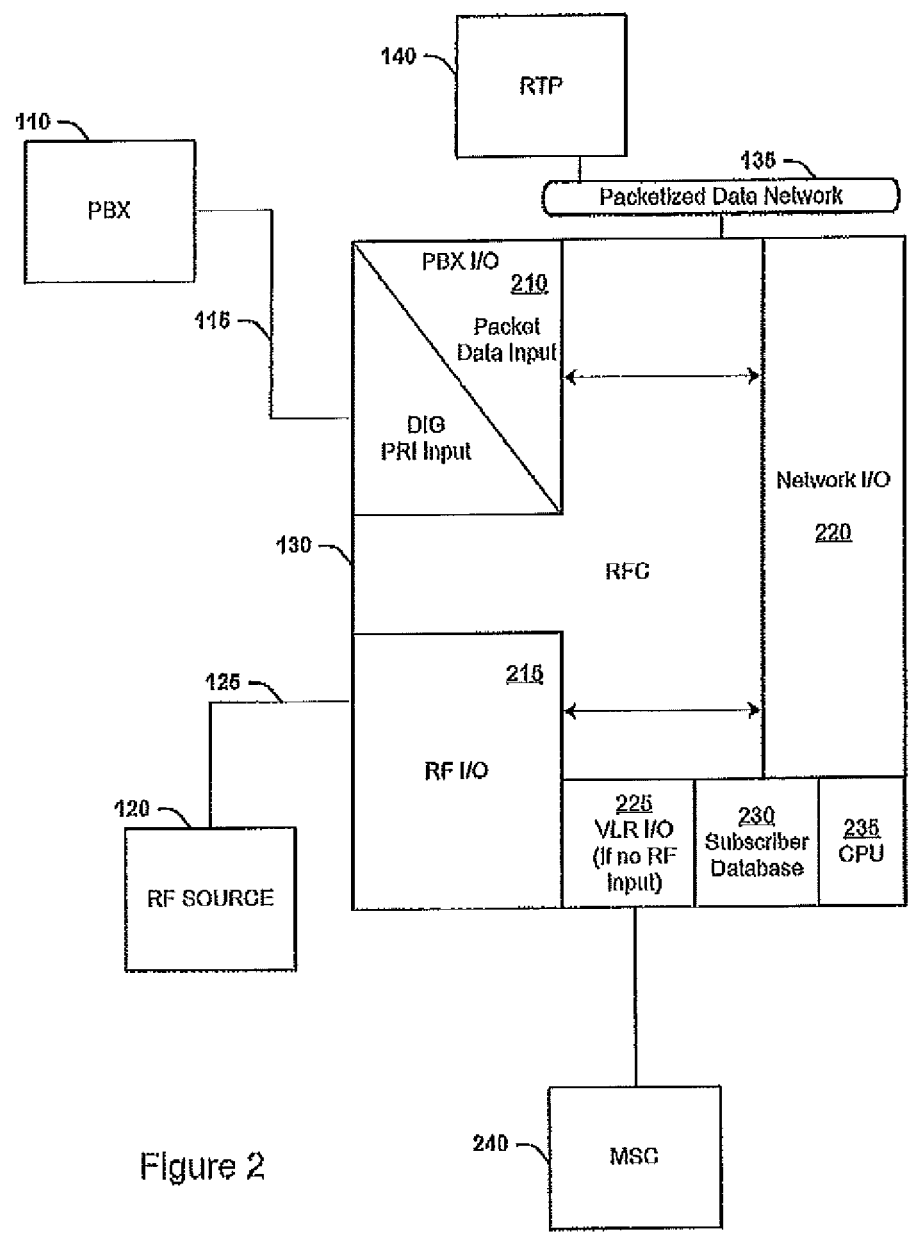
FIG. 2 illustrates an RF controller utilizing a packet based network in an embodiment consistent with the principles of the present invention.

FIG. 2 illustrates a wireless adjunct 130 utilizing a packet based network in an embodiment consistent with the principles of the present invention. The wireless adjunct 130 may comprise a switching unit interface 210 for communicating with the PBX 110 via PBX communication link 115. The switching unit interface 210 may be an interchangeable I/O unit and associated hardware, such that any of a variety of communication options may be implemented. A switching unit interface 210 appropriate to the capabilities of the PBX 110 may be installed. For example, where the PBX 110 does not have VOIP capabilities, the switching unit interface 210 may comprise a T1 or E1 interface to interface to analog or digital voice data on the PBX communication link 115 and signaling using PRI. In another example, the switching unit interface 210 may comprise an Ethernet link for connecting to a PBX 110 having VOIP capabilities. Embodiments of the present invention may contain links to multiple PBXs 110, with multiple switching unit interfaces 210 present within the RFC 130.

The wireless adjunct 130 may also comprise a network interface 220 for communication across the packetized data network 135 with the RTP 140. The network interface 220 may be a wide variety of interfaces for communicating with a packetized data network. For instance, the network interface 220 may be a 10BaseT or 100BaseT Ethernet or an interface to an 802.11b wireless network. It is contemplated that the network interface 220 may be interchangeable with any type that exists today or will be developed in the future. In addition, multiple network interfaces 220 may be present for communicating with a plurality of individual packetized data networks.

The wireless adjunct 130 may also comprise a controller 235 for coordinating and performing the functionality of the RFC 130 and its components. The controller 235 may control RF processes, such as call setup and handoff between RTPs 140a-b. The controller 235 may accept call setup requests from the PBX 110, upon receiving an incoming call to the PBX, and direct the call to the appropriate RTP 140. The controller 235 may also perform system operations and maintenance for the wireless adjunct system comprising the RFC 130 and one or more RTPs 140. The controller 235 may translate the incoming voice data from baseband data from the RF source 120 into packetized voice data for transmission to the RTPs 140. Similarly, where the PBX communications link 115 is a T1 or E1/PRI link, the controller 235 may translate the non-packetized voice data to packetized voice data for transmission to the RTPs 140a-b. In addition to providing non-packetized voice data to packetized voice data conversion, the controller 235 may provide packetized voice data to non-packetized voice data conversion.

In cooperation with a subscriber database 230 for maintaining a database of subscribers with associated PBXs 110, the controller 235 routes calls from a mobile unit to either a PBX 110 or an RF source 120. For example, where the mobile unit belongs to a caller who is a resident of the building or PBX 110, outgoing mobile unit calls may be routed through the PBX 110 to the PSTN 105 for placement. However, where the mobile unit belongs to a caller who is a guest in the building and is not present in the subscriber database, the controller 235 may route outgoing mobile unit calls to the RF source 120 for transmission across the mobile network.

Because embodiments of the present invention may feature an RFC 130 capable of functioning in a multi-tenant building and interfacing to a plurality of PBXs 110 and a plurality of packetized data networks 135, the controller 235 may operate to route outgoing mobile unit calls to the appropriate PBX 110 and may operate to route incoming mobile unit calls to the appropriate packetized data network 135. In this fashion, multiple tenants within a building could share the costs associated with the functions of the RFC 130.

The RFC 130 may also include a Visitor Location Registry (VLR) 225. The VLR 225 may maintain a database of mobile units that are active within the reach of any RTPs 140, so that incoming mobile unit calls can be efficiently routed. The VLR 225 may also provide an interface to a Mobile Switching Center (MSC) 240. The RFC 130 may also include an RF interface 215 for communicating with an external RF source 120 via an RF source link 125, for example a Base Station. As previously mentioned, the RF interface 215 could provide interconnectivity between the RFC 130 and the mobile network without interconnecting through the PBX 110. As previously mentioned, the RF interface 215 thus provides guests in the building with network access. The RF interface 215 may convert the incoming RF signal to baseband voice and data for later conversion to packetized voice data by the controller 235.

Figure 3:
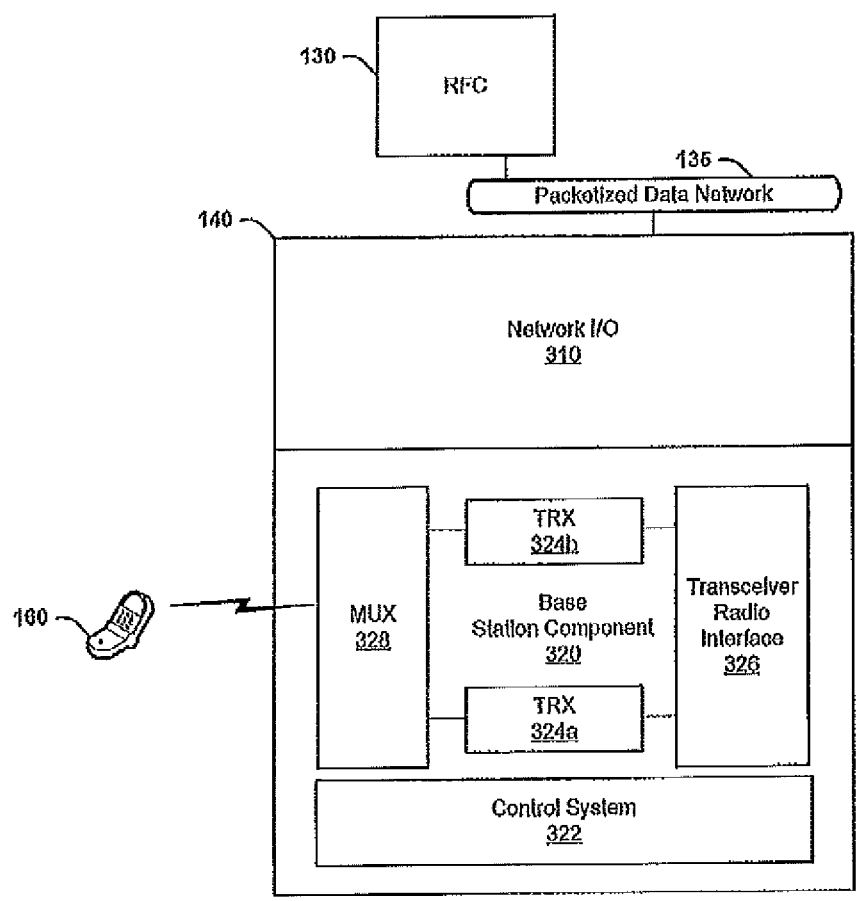
FIG. 3 illustrates a radio transmit point utilizing a packet based network in an embodiment consistent with the principles of the present invention.

FIG. 3 illustrates a radio transmit point 140 utilizing a packet based network in an embodiment consistent with the principles of the present invention. The RTP 140 may comprise a network interface 310 in communication with a base station component 320. The network interface 310 is similar to the network interface 220 of the RFC 130. The network interface 310 permits communication between the RFC 130 and the RTP 140 over the packetized data network 135. Embodiments consistent with the present invention may provide an interchangeable network interface 310 for communicating with a wide variety of packet based networks. For example, network interface 310 may be a 10BaseT or 100BaseT Ethernet interface or an 802.11b interface. The network interface is in communication with the base station component 320.

The base station component 320 provides functionality to the air interface to the mobile unit 160. The base station component 320 may feature one or more interfaces to a wide variety of air interfaces including, but not limited to, TDMA, CDMA, GSM, UMTS, and CDMA2000. The base station component 320 may comprise a transceiver radio interface 326 in communication with a transceiver 324 that may operate through a mulitplexer 328 to the mobile unit 160. A control system 322 controls the operation of the base station component 320. The control system 322 may perform call setup and processing and communicate with the RFC 130 for call set and handoff management. The control system 322 may perform frequency management and fault management functions as well, including reporting fault conditions to the RFC 130. Specific operation and functionality of the control system 322 is somewhat dependent on the air interface employed, as the standards call for varying functionality between them.

Figure 4:
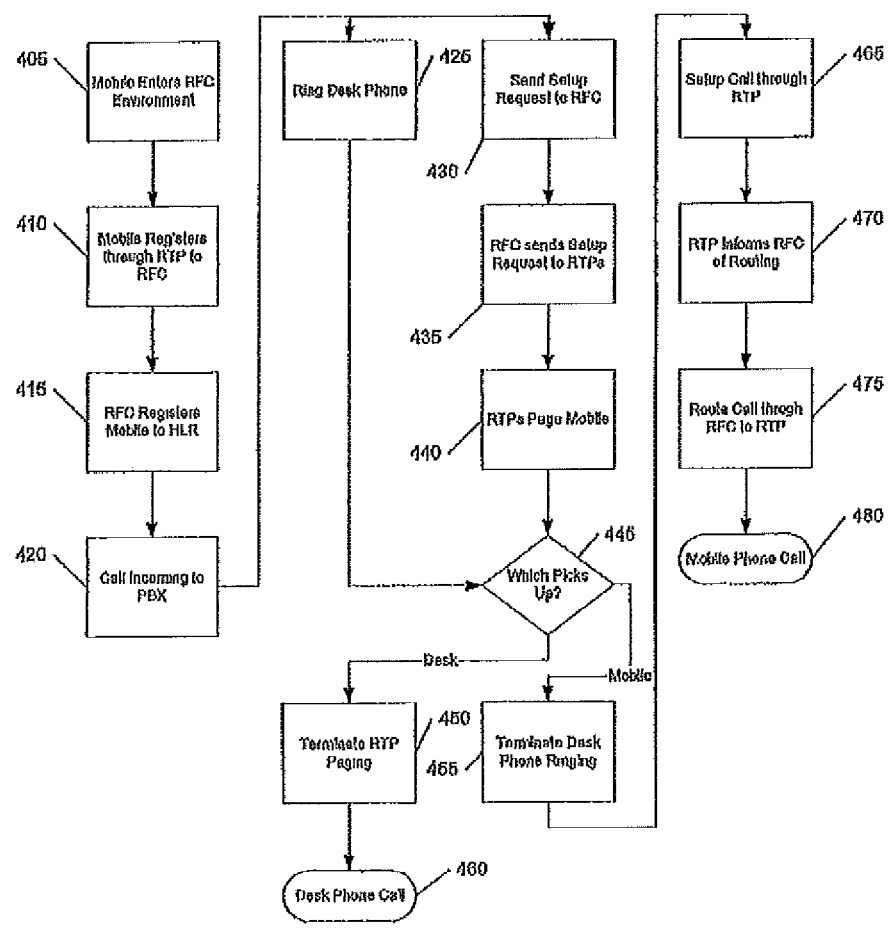
FIG. 4 illustrates a method of routing incoming calls from a switching unit to a mobile unit in an embodiment consistent with the principles of the present invention.

FIG. 4 illustrates a method of routing incoming calls from a switching unit 110 to a mobile unit 160 in an embodiment consistent with the principles of the present invention. At stage 405, as a mobile unit enters the environment of an RTP, the mobile unit is recognized by the RTP. At stage 410, the mobile unit registers with the RTP, and the RTP notifies the RFC. The RFC may register the mobile unit in its VLR. At stage 415, the RFC may register the mobile unit in the Home Location Register (HLR) located on the network subsystem. This operation may be performed through the MSC link on the RFC.

At stage 420, an incoming call is received by the PBX. At this point, depending upon the programming of the PBX, the PBX will page both the desk unit for the destination number of the call and will request the RFC to page the mobile unit for the destination number's owner. This may be performed simultaneously, as illustrated in the figure, or sequentially, depending upon the programming of the PBX. At stage 425, the PBX rings the desk phone of the destination number.

Assuming simultaneous calling has been programmed into the PBX, at stage 430 a setup request is sent from the PBX to the RFC.

At stage 435, the RFC may send the setup request to RTPs within the network. At stage 440, the RTPs receiving the setup request page the mobile unit.

At stage 445, the PBX examines which operation successfully connected the call: the desk phone or the mobile unit. If the desk phone responds first, at stage 450 the RTP via the RFC is instructed to terminate paging and at stage 460 the call is placed through the desk phone. If the mobile unit responds first, at stage 455, the desk phone terminates ringing.

At stage 465 the call is setup through the RTP. At stage 470, the RTP informs the RFC of the routing information, i-e., the appropriate RTP to route the call to. At stage 475 the RFC routes the call to the RTP, and at stage 480 the mobile phone call occurs with the RFC routing packetized voice data between the PBX and the RTP.

Figure 5:
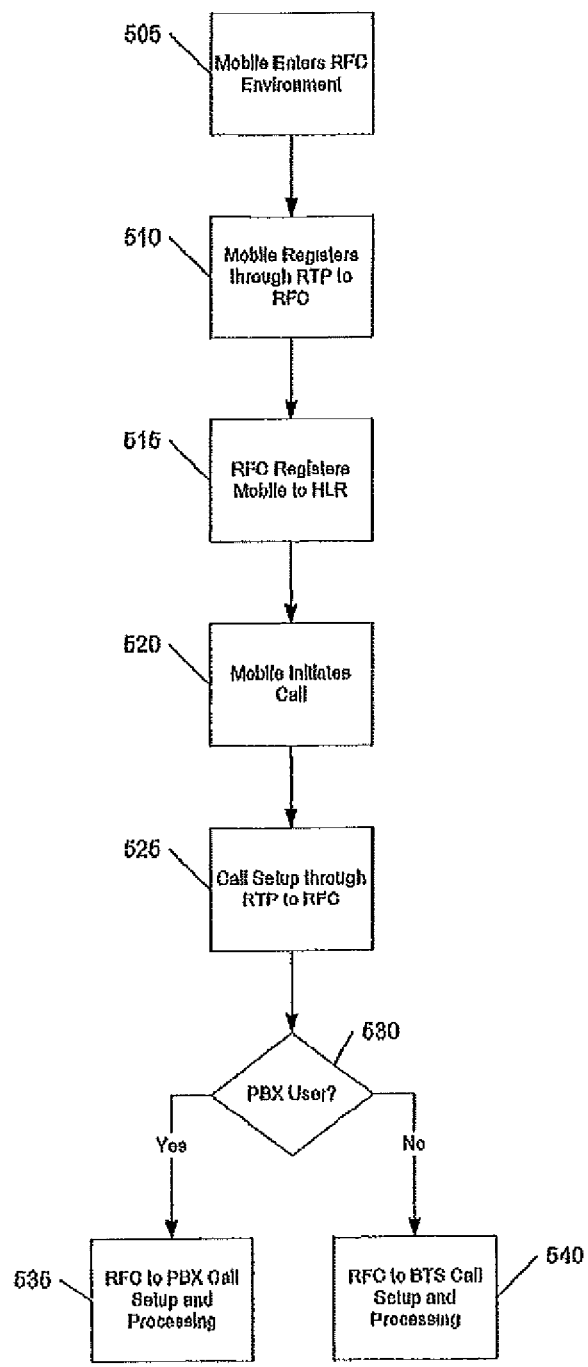
FIG. 5 illustrates a method of routing outgoing calls from a mobile unit to a switching unit in an embodiment consistent with the principles of the present invention.

FIG. 5 illustrates a method of routing outgoing calls from a mobile unit 160 to a switching unit 110 in an embodiment consistent with the principles of the present invention. At stage 505, a mobile unit enters the RFC environment and registers with the RTP. At stage 510, the mobile unit registers through the RTP to the RFC, storing the data in the VLR. At stage 515, the RFC may register the mobile unit in the HLR through an external MSC. At stage 520, the mobile unit goes off hook and initiates a call. At stage 525, calf setup occurs between the RTP and the RFC. At stage 530, if the mobile unit belongs to a resident of the PBX or building, the call is routed through the PBX at stage 535. However, if the mobile unit belongs to a guest in the building, the RFC routes the call to the RF source for call setup and processing at stage 540.

Figure 6:
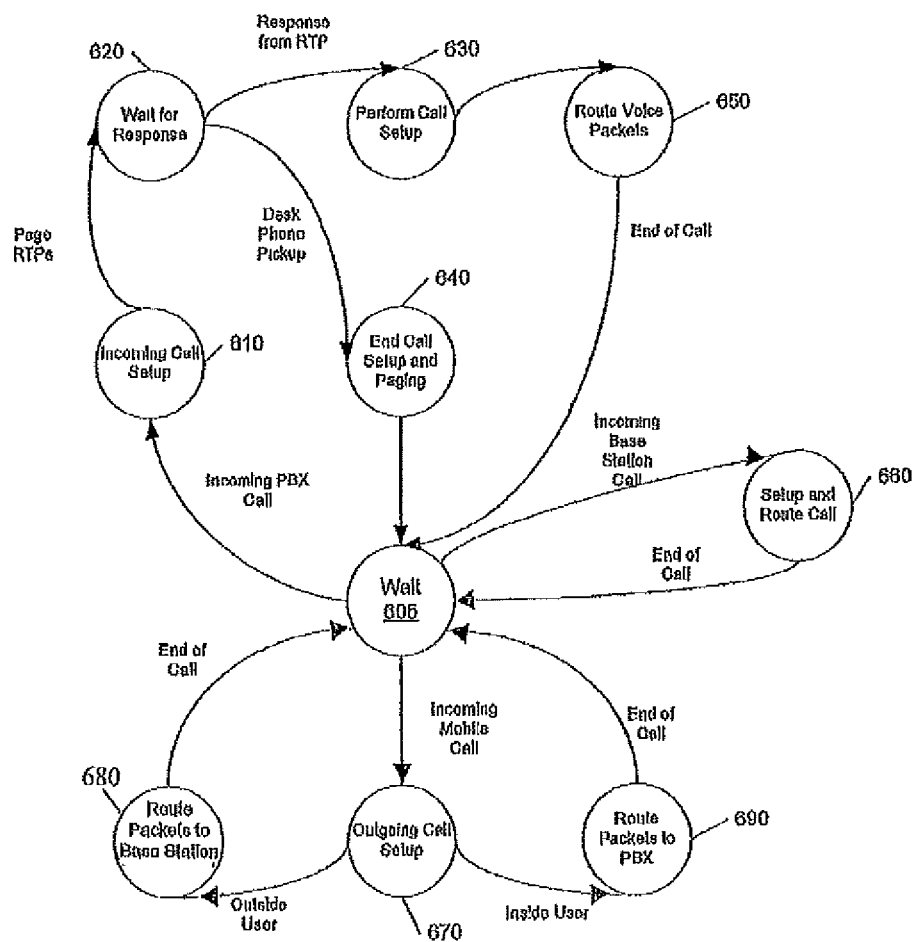
FIG. 6 illustrates a state diagram for a wireless adjunct in an embodiment consistent with the principles of the present invention.

FIG. 6 illustrates a state diagram for a wireless adjunct in an embodiment consistent with the principles of the present invention. For any given telephone call, the wireless adjunct may be in a variety of states. At state 605, the wireless adjunct is waiting for a call to route. Upon receiving an incoming call from the PBX, the wireless adjunct goes into an incoming call setup state 610. The wireless adjunct may page the mobile units via the RTPs, and at state 620 wait for a response from the RTPs. If the RFC receives an instruction from the PBX to end the paging, for instance if the desk phone picks up or the originator of the call hangs up, the RFC moves to state 640 where the call setup and paging is ended and the RFC returns to the wait state 605.

At state 620, if the RFC receives a response from an RTP, the RFC goes to state 630 for performing call setup operations. Once the call is setup, the RFC begins to route voice packets at state 650. At state 650, the RFC may also need to perform conversion to and from packetized voice data for a PBX that does not have VOIP functionality. When the call ends, the RFC returns to wait state 605.

If the RF source, or base station, receives an incoming call, the RFC goes to state 660 which represents a similar call setup process to states 610, 620, 630, and 650. The call is setup, a page is made to the RTPs, and voice packets are routed to the appropriate RTP. When the call ends, the RFC returns to the wait state 605.

If the mobile unit initiates a call, the RFC goes to state 670 and initiates an outgoing call setup. The RFC may consult its subscriber database and route the calls to either the appropriate PBX or the RF source, depending upon if the mobile unit's user is a guest or a resident of the building. If the mobile unit is a guest, the call is setup with the RF source and at stage 680 voice packets are converted into and from broadband and routed to the RF source. If the mobile unit is a resident, the call is setup with the appropriate PBX and the voice packets are routed to and from the PBX at state 690. Upon the ending of the call, the RFC returns to the wait state 605.

Of course, because the RFC may route multiple calls simultaneously through multiple processes, the RFC may be in more than one state at any given point in time with each state associated with a call process.

Figure 7:
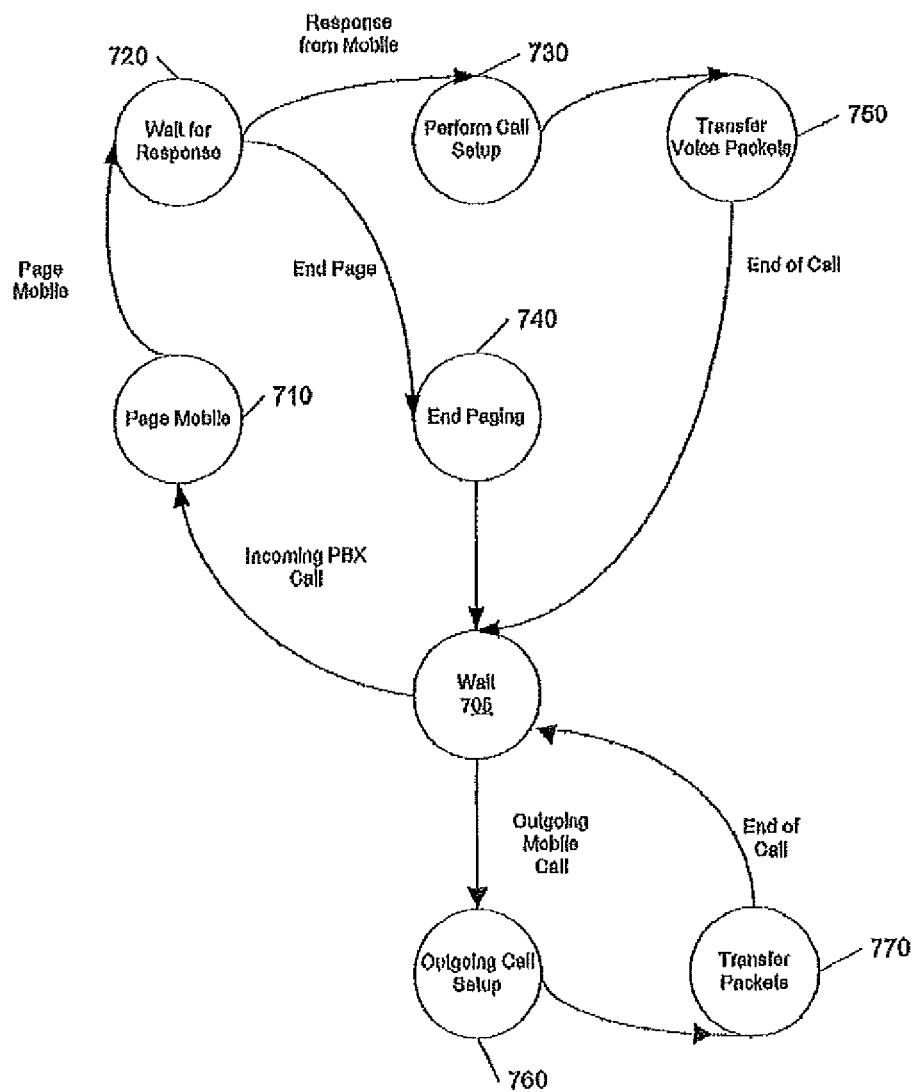
FIG. 7 illustrates a state diagram for a radio transmit point utilizing a packet based network in an embodiment consistent with the principles of the present invention.

FIG. 7 illustrates a state diagram for a radio transmit point utilizing a packet based network in an embodiment consistent with the principles of the present invention. For any given telephone call, the RTP may be in a variety of states. At the wait state 705, the RTP waits for an incoming call from a PBX or an outgoing call from a mobile unit. When the PBX receives an incoming call, the RFC requests the RTP to page the mobile unit and the RTP goes to state 710 for paging the mobile unit. At state 720, the RTP waits for a response from the mobile unit. The RTP may receive an end page request from the RFC, thus going to state 740, ending paging, and returning to wait state 705.

If the mobile unit responds to the page, the RTP goes to call setup state 730 and initiates call setup procedures. At state 750, following call setup, the RTP transfers voice packets between the mobile unit and the RTP. When the call ends, the RTP returns to state 705.

If an outgoing call is made from the mobile unit, the RTP initiates outgoing call setup at state 760. Once the outgoing call is setup via the RFC, the RTP goes to state 770 and transfers voice packets between the RFC and the mobile unit. When the call ends, the RTP returns to wait state 705.

Of course, because the RTP may handle multiple calls simultaneously through multiple processes, the RTP may be in more than one state at any given point in time with each state associated with a call process.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
   receiving, by a wireless adjunct unit comprising a processor, from a private branch exchange, an indication of an incoming call directed to a mobile unit;
   in response to receiving the indication of the incoming call directed to the mobile unit from the private branch exchange, sending, by the wireless adjunct unit, a setup request to a radio transmit point to cause the radio transmit point to send a page to the mobile unit;
   while waiting for a response from the radio transmit point, determining, by the wireless adjunct unit, whether an instruction is received from the private branch exchange to end paging of the mobile unit; and
   in response to receiving the response from the radio transmit point prior to receiving the instruction from the private branch exchange to end paging of the mobile unit,
      converting, by the wireless adjunct, non-packetized voice data of the incoming call received from the private branch exchange to packetized voice data, and
      routing, by the wireless adjunct unit, via a packetized data network, the packetized voice data of the incoming call to the radio transmit point for transmission to the mobile unit.

2. The method of claim 1, further comprising prior to receiving the indication of the incoming call, waiting, by the wireless adjunct unit, for the indication, wherein the wireless adjunct unit is in a wait state while waiting for the indication.

3. The method of claim 2, further comprising when the incoming call ends, returning, by the wireless adjunct unit to the wait state.

4. A wireless adjunct unit comprising:
   a processor; and
   a non-transitory computer-readable-storage device comprising instructions that when executed by the processor cause the processor to perform operations comprising:
      receiving, from a private branch exchange, an indication of an incoming call directed to a mobile unit,
      in response to receiving the indication of the incoming call directed to the mobile unit from the private branch exchange, sending a setup request to a radio transmit point to cause the radio transmit point to send a page to the mobile unit,
      while waiting for a response from the radio transmit point, determining whether an instruction is received from the private branch exchange to end paging of the mobile unit, and
      in response to receiving the response from the radio transmit point prior to receiving the instruction from the private branch exchange to end paging of the mobile unit,
         converting non-packetized voice data of the incoming call received from the private branch exchange to packetized voice data, and
         routing, via a packetized data network, the packetized voice data of the incoming call to the radio transmit point for transmission to the mobile unit.

5. A non-transitory computer-readable-storage device comprising instructions that, when executed by a wireless adjunct unit, cause the wireless adjunct unit to perform operations comprising:
   receiving, from a private branch exchange, an indication of an incoming call directed to a mobile unit;
   in response to receiving the indication of the incoming call directed to the mobile unit from the private branch exchange, sending a setup request to a radio transmit point to cause the radio transmit point to send a page to the mobile unit;
   while waiting for a response from the radio transmit point, determining whether an instruction is received from the private branch exchange to end paging of the mobile unit; and
   in response to receiving the response from the radio transmit point prior to receiving the instruction from the private branch exchange to end paging of the mobile unit,
      converting non-packetized voice data of the incoming call received from the private branch exchange to packetized voice data, and
      routing, via a packetized data network, the packetized voice data of the incoming call to the radio transmit point for transmission to the mobile unit.

6. The non-transitory computer-readable-storage device of claim 5, wherein the operations further comprise:
   receiving, from the radio transmit point, when the mobile unit enters an environment of the radio transmit point, a notification associated with the mobile unit; and
   in response to receiving the notification from the radio transmit point, registering the mobile unit in a visitor location registry of the wireless adjunct unit.

7. The non-transitory computer-readable-storage device of claim 5, wherein the operations further comprise receiving, via the radio transmit point, an indication of an outgoing call from the mobile unit.

8. The non-transitory computer-readable-storage device of claim 7, wherein the operations further comprise:
   in response to receiving the indication of the outgoing call from the mobile unit, determining whether the mobile unit is a resident of the private branch exchange or a guest;
   in response to determining that the mobile unit is a resident of the private branch exchange, routing the outgoing call from the mobile unit through the private branch exchange to a first destination location; and
   in response to determining that the mobile unit is a guest, routing the outgoing call from the mobile unit through a radio frequency source to a second destination location.

9. The non-transitory computer-readable-storage device of claim 8, wherein determining whether the mobile unit is a resident of the private branch exchange or a guest comprises querying a subscriber database to determine whether the mobile unit is a resident of the private branch exchange or a guest.

10. The method of claim 1, further comprising
    receiving, from the radio transmit point, when the mobile unit enters an environment of the radio transmit point, a notification associated with the mobile unit; and
    in response to receiving the notification from the radio transmit point, registering the mobile unit in a visitor location registry of the wireless adjunct unit.

11. The method of claim 1 further comprising receiving, via the radio transmit point, an indication of an outgoing call from the mobile unit.

12. The method of claim 11, further comprising:
    in response to receiving the indication of the outgoing call from the mobile unit, determining whether the mobile unit is a resident of the private branch exchange or a guest;
    in response to determining that the mobile unit is a resident of the private branch exchange, routing the outgoing call from the mobile unit through the private branch exchange to a first destination location; and
    in response to determining that the mobile unit is a guest, routing the outgoing call from the mobile unit through a radio frequency source to a second destination location.

13. The method of claim 12, wherein determining whether the mobile unit is a resident of the private branch exchange or a guest comprises querying a subscriber database to determine whether the mobile unit is a resident of the private branch exchange or a guest.

14. The wireless adjunct unit of claim 4, wherein the operations further comprise:
    receiving, from the radio transmit point, when the mobile unit enters an environment of the radio transmit point, a notification associated with the mobile unit; and
    in response to the notification from the radio transmit point, registering the mobile unit in a visitor location registry of the wireless adjunct unit.

15. The wireless adjunct unit of claim 4, wherein the operations further comprise receiving, via the radio transmit point, an indication of an outgoing call from the mobile unit.

16. The wireless adjunct unit of claim 15, wherein the operations further comprise:
    in response to receiving the indication of the outgoing call from the mobile unit, determining whether the mobile unit is a resident of the private branch exchange or a guest;
    in response to determining that the mobile unit is a resident of the private branch exchange, routing the outgoing call from the mobile unit through the private branch exchange to a first destination location; and
    in response to determining that the mobile unit is a guest, routing the outgoing call from the mobile unit through a radio frequency source to a second destination location.

17. The wireless adjunct unit of claim 16, wherein determining whether the mobile unit is a resident of the private branch exchange or a guest comprises querying a subscriber database to determine whether the mobile unit is a resident of the private branch exchange or a guest.

* * * * *